United States Patent
Okada

(10) Patent No.: US 9,001,670 B2
(45) Date of Patent: Apr. 7, 2015

(54) MONITORING APPARATUS, MONITORING METHOD, AND COMPUTER PRODUCT

(75) Inventor: Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 350 days.

(21) Appl. No.: 13/478,207

(22) Filed: May 23, 2012

(65) Prior Publication Data

US 2013/0044618 A1    Feb. 21, 2013

(30) Foreign Application Priority Data

Aug. 18, 2011   (JP) ................................ 2011-179256

(51) Int. Cl.
*H04L 12/26*    (2006.01)
*H04W 52/02*    (2009.01)
*H04L 12/24*    (2006.01)

(52) U.S. Cl.
CPC ....... *H04W 52/0219* (2013.01); *H04L 43/0858* (2013.01); *H04L 41/14* (2013.01)

(58) Field of Classification Search
USPC ................................................ 370/229–253
See application file for complete search history.

(56) References Cited

U.S. PATENT DOCUMENTS 7,599,308 B2 * 10/2009 Laver et al. .................... 370/252
2004/0003026 A1 * 1/2004 Fukumoto .................... 709/201

FOREIGN PATENT DOCUMENTS

JP    2008-15722    1/2008
JP    2010-220048    9/2010

OTHER PUBLICATIONS

Japanese Office Action mailed Feb. 17, 2015 for corresponding Japanese Patent Application No. 2011-179256, with Partial English Translation, 5 pages.
Nakamura, Nobuyuki et al., "The Method for detecting Silent failures in Virtual Networks," Corporate Research & Development Center, Oki Electric Industry Co., Ltd., IEICE Technical Report IN2010-182(Mar. 2011), The Institute of Electronics, Information and Communication Engineers, Feb. 24, 2011, vol. 110, No. 449, pp. 229-234, with Partial English Translation.

* cited by examiner

*Primary Examiner* — Kwang B Yao
*Assistant Examiner* — Juvena Loo
(74) *Attorney, Agent, or Firm* — Fujitsu Patent Center

(57) ABSTRACT

A monitoring apparatus includes a processor to execute a process that includes calculating the delay of each of the data among acquired series of data transmitted from a communication apparatus that performs transmission processing with regularity; extracting from the series of data, a set of data whose calculated delays are greater than or equal to a threshold; and identifying, from among the extracted set of data, a pattern of data appearing successively for a given number of times or more, at equivalent intervals; and an output device that outputs information indicating the data related to the identified pattern.

7 Claims, 13 Drawing Sheets

FIG.3

| RTP SEQUENCE NUMBER | TRANSMISSION-SIDE TIME STAMP | RECEPTION-SIDE TIME STAMP | TRANSMISSION SOURCE IP ADDRESS | DESTINATION IP ADDRESS | TRANSMISSION SOURCE PORT | DESTINATION PORT | SSRC IDENTIFIER |
|---|---|---|---|---|---|---|---|
| 4224 | 2064694807 | 3033045434 | 192.168.10.1 | 192.168.10.2 | 20000 | 20000 | 1 |
| ... | ... | ... | ... | ... | ... | ... | ... |

| CLASS NAME | FREQUENCY |
|---|---|
| 0 OR GREATER AND LESS THAN 10 | 138 |
| 10 OR GREATER AND LESS THAN 20 | 3262 |
| 20 OR GREATER AND LESS THAN 30 | 11861 |
| 30 OR GREATER AND LESS THAN 40 | 19 |
| 40 OR GREATER AND LESS THAN 50 | 4 |
| 50 OR GREATER AND LESS THAN 60 | 4 |
| 60 OR GREATER AND LESS THAN 70 | 4 |
| 70 OR GREATER AND LESS THAN 80 | 12 |
| 80 OR GREATER AND LESS THAN 90 | 8 |
| 90 OR GREATER AND LESS THAN 100 | 0 |
| 100 OR GREATER AND LESS THAN 110 | 0 |
| 110 OR GREATER AND LESS THAN 120 | 0 |
| 120 OR GREATER AND LESS THAN 130 | 0 |
| 130 OR GREATER AND LESS THAN 140 | 1 |
| 140 OR GREATER AND LESS THAN 150 | 1 |
| 150 OR GREATER AND LESS THAN 160 | 1 |
| 160 OR GREATER AND LESS THAN 170 | 0 |
| 170 OR GREATER AND LESS THAN 180 | 1 |

FIG.10

| RTP SEQUENCE NUMBER | TRANSMISSION-SIDE TIME STAMP | RECEPTION-SIDE TIME STAMP | DELAY (us) | VALUE OF JITTER (ms) |
|---|---|---|---|---|
| 4224 | 2064694807 | 3033045434 | 0 | 0 |
| 4225 | 2064715314 | 3033065945 | 4 | 0.00 |
| 4226 | 2064734847 | 3033085469 | -9 | 0.00 |
| 4227 | 2064755353 | 3033107892 | 1917 | 0.12 |
| ... | ... | ... | ... | ... |
| 4444 | 2069095208 | 3037510637 | 62707 | 5.3343 |
| ... | ... | ... | ... | ... |
| 4454 | 2069295404 | 3037691151 | 44917 | 8.245 |
| ... | ... | ... | ... | ... |
| 4464 | 2069494623 | 3037858031 | 11402 | 7.7357 |
| ... | ... | ... | ... | ... |

1010

1020

| MAX | MIN | AVG |
|---|---|---|
| 2.45 | 0.00 | 1.08 |

1030

| MAX | MIN | AVG |
|---|---|---|
| 17.90 | 0.00 | 3.51 |

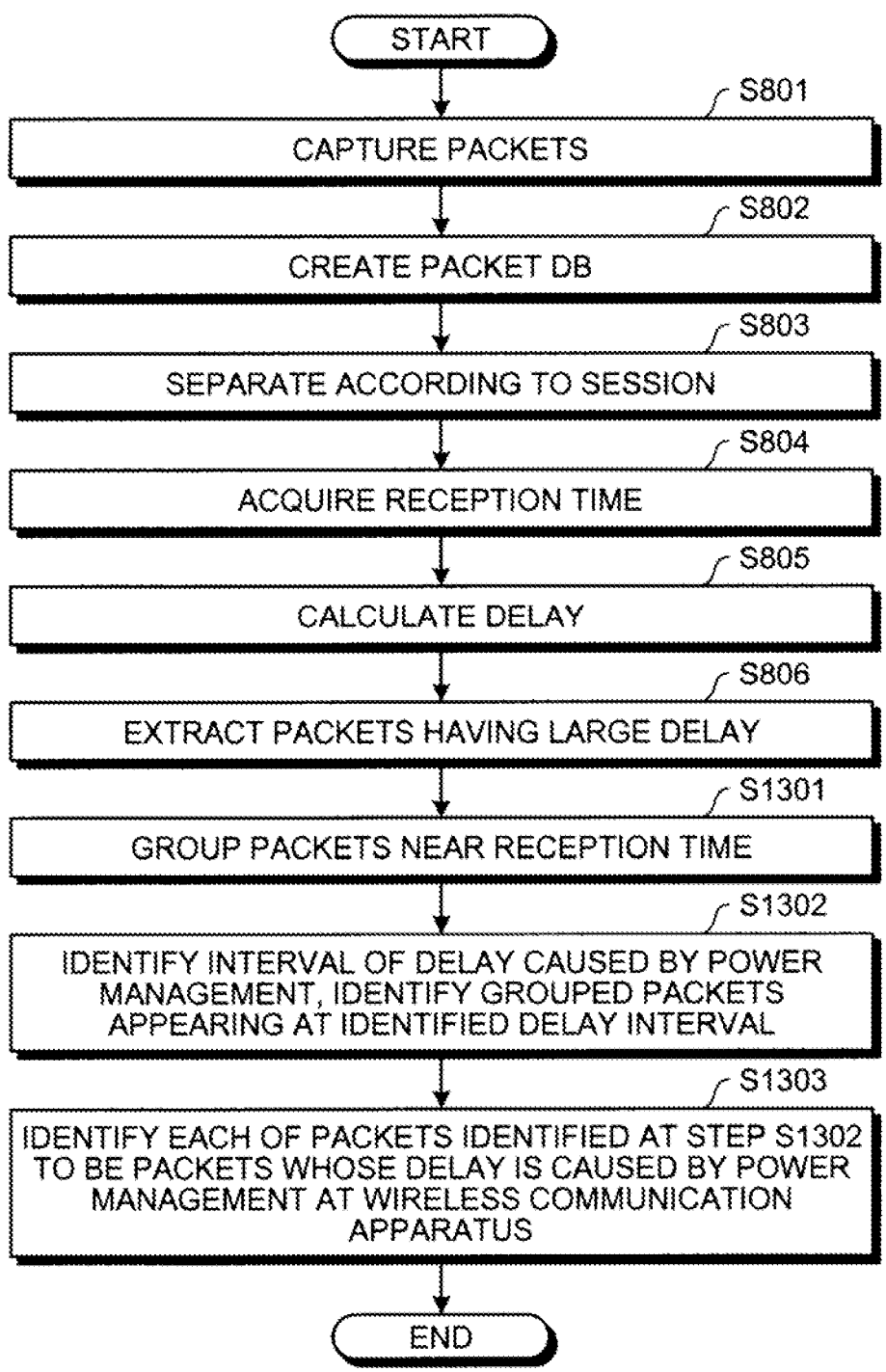

MONITORING APPARATUS, MONITORING METHOD, AND COMPUTER PRODUCT

CROSS REFERENCE TO RELATED APPLICATIONS

This application is based upon and claims the benefit of priority of the prior Japanese Patent Application No. 2011-179256, filed on Aug. 18, 2011, the entire contents of which are incorporated herein by reference.

FIELD

The embodiments discussed herein are related to network monitoring.

BACKGROUND

In recent years, bidirectional communication over networks that communicate packets has increased accompanying the development of information technology. For example, IP telephony, which uses a voice over internet protocol (VoIP) function that enables verbal communication over the internet by an exchange of packetized voice data over networks that communicate packets, has become prevalent. For service providers, the monitoring and management of the communication quality of IP telephony services is important.

Networks that communicate packets have wireless intervals and in such networks, wireless communication apparatuses may be used as terminals on the network. In this case, packet delay at the wireless intervals is assumed to occur, however, to identify which portion of the wireless intervals is the cause of the delay, information that is included in the packets only when the packets are in the wireless intervals is necessary. Consequently, even if a packet on a wired interval is captured, it is not clear which portion of the wireless intervals is the cause of delay.

Conventionally, technology identifies an end terminal to be the cause of delay, based on the packet reception count at the end terminal and the count of packets passing at a gateway (see, for example, Japanese Laid-Open Patent Publication No. 2010-220048). A related technology determines the execution interval of processing identified as the cause of failure and facilitates power savings, based on the interval of the intermittent operation of a sensor node on a wireless network (for example, see Japanese Laid-Open Patent Publication No. 2008-15722).

Nonetheless, with the technologies described above, packets have to be monitored at the wireless communication apparatus that is the end terminal and in the wireless intervals on the network communicating packets. As a result, a monitoring apparatus has to be disposed in downstream wireless intervals of the communication network and since the number of monitoring apparatuses becomes huge, the cost also increases.

Meanwhile, when packets from the wireless interval to a wired interval pass through a relay device, the information that the packets have while in the wireless interval is lost. Consequently, even if packets are monitored along upstream wired intervals of the network, which portion of the wireless intervals is the cause of delay cannot be identified.

SUMMARY

According to an aspect of an embodiment, a monitoring apparatus includes a processor to execute a process that includes calculating the delay of each of the data among acquired series of data transmitted from a communication apparatus that performs transmission processing with regularity; extracting from the series of data, a set of data whose calculated delays are greater than or equal to a threshold; and identifying, from among the extracted set of data, a pattern of data appearing successively for a given number of times or more, at equivalent intervals; and an output device that outputs information indicating the data related to the identified pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram depicting the contents of a packet DB 230.

FIG. 4 is a diagram depicting the contents of a class DB 240 stored in a RAM 203 depicted in FIG. 2.

FIG. 10 is a diagram depicting an example of quality analysis when delayed packets P appear one at a time, at equivalent intervals.

FIG. 13 is a flowchart of processing for identification of the cause of failure when delayed packets P appear a few at a time, at equivalent intervals.

DESCRIPTION OF EMBODIMENTS

Preferred embodiments of the present invention will be explained with reference to the accompanying drawings. A monitoring apparatus according to an embodiment captures packets on a wired interval and from among the captured packets, identifies packets whose delay is caused by power management at a wireless communication apparatus on the network.

Here, the power management at a wireless communication apparatus has a tendency to cause a large delay during a given time interval. Thus, the monitoring apparatus calculates the delay of each of the captured packets; and based on the delay of each of the captured packets and from among the captured packets, extracts a set of packets having a large delay.

From among the set of packet having a large delay the monitoring apparatus identifies packets captured at equivalent intervals, whereby the monitoring apparatus is able to identify packets whose delay is caused by the power management at a wireless communication apparatus.

Processing by the monitoring apparatus to identify the cause of failure will be described with reference to an example when a wireless communication apparatus performs packet transmission, at a given time interval, to the network.

Figure 1:
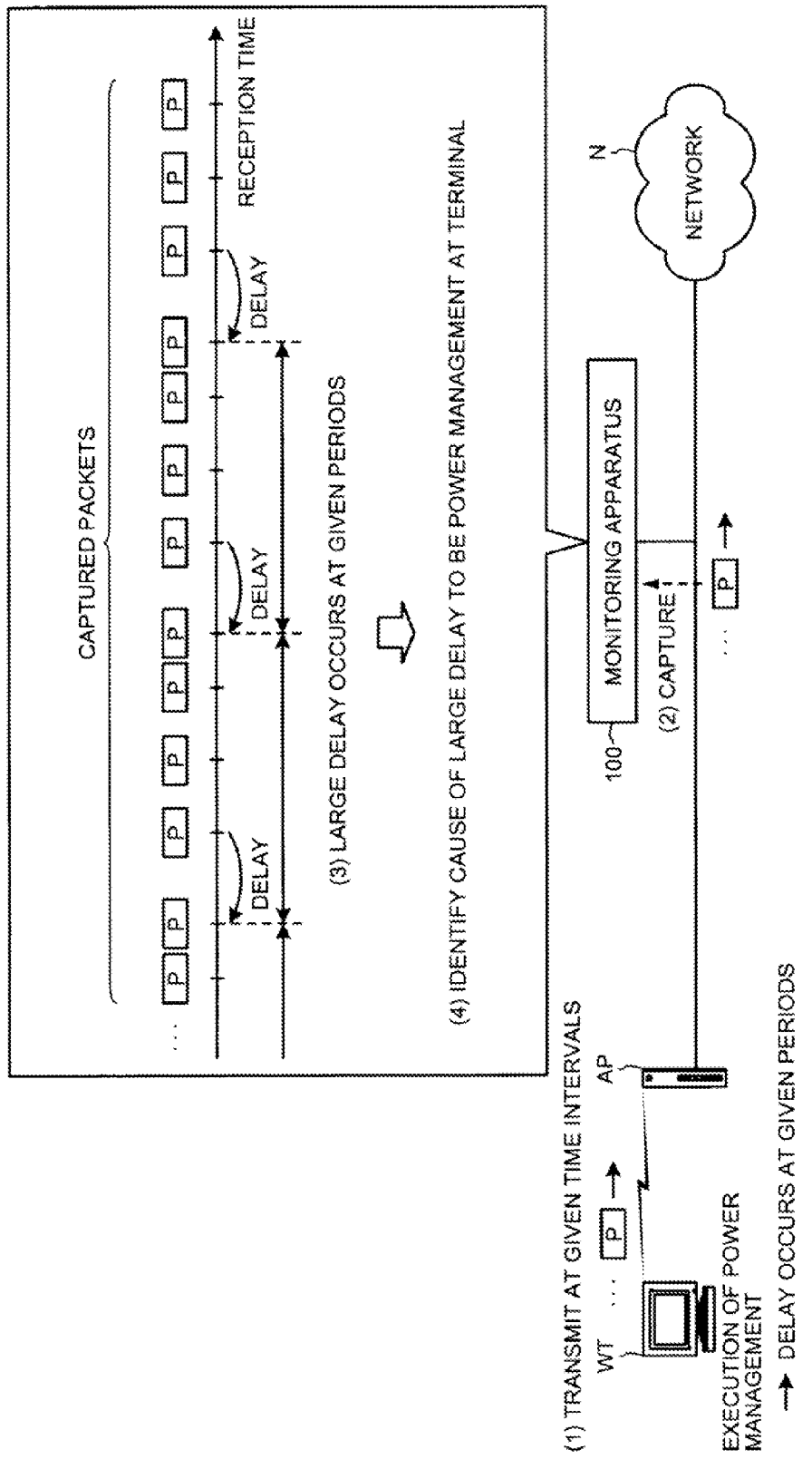
FIG. 1 is a diagram depicting processing by a monitoring apparatus to identify the cause of failure.

FIG. 1 is a diagram depicting processing by the monitoring apparatus to identify the cause of failure. In FIG. 1, a communication system C includes a wireless communication apparatus WT, an access point AP, and a network N. In the communication system C, a packet P is transmitted from the wireless communication apparatus WT, through the access point AP, to the network N. A monitoring apparatus 100 captures the packets P on a communication path in a wired interval between the access point AP and the network N.

(1) The wireless communication apparatus WT performs transmission processing of the packets P at a given time interval. IP telephony using a VoIP function can be given as an example of a service that performs transmission processing of the packets P at a given time interval. Here, the wireless communication apparatus WT is executing power management, which has a tendency to cause large delays at the given time interval.

(2) The monitoring apparatus 100 captures the packets P transmitted from the wireless communication apparatus WT. In FIG. 1, an example of the captured packets is given. If the packets P include packets P transmitted by another wireless communication apparatus WT different from the wireless communication apparatus WT, the packets P transmitted by the other wireless communication apparatus WT are removed. The monitoring apparatus 100 calculates the delay of each of the captured packets. For example, the difference of the reception times (capture times) of 2 successively received packets P is calculated as the delay.

(3) Here, the captured packets P have a large delay at each given time interval, consequent to the power management at the wireless communication apparatus WT. As a result, from among the captured packets P, the monitoring apparatus 100 extracts a set of the packets P having a large delay based on the delay of each of the captured packets P; and from among the set of packets P having a large delay, the monitoring apparatus 100 identifies a packet P captured at the given time interval.

(4) Thus, the monitoring apparatus 100 can identify packets P whose delay is caused by power management at the wireless communication apparatus WT. In this case, since the monitoring apparatus 100 identifies the cause of failure from the delay of the packets P, the monitoring apparatus 100 can identify the cause of failure even from packets P that are in a wired interval and do not have information indicating that power management different from the wireless interval was performed.

As a result, since the cause of failure arising in a wireless interval can be identified in a wired interval, the monitoring apparatus 100 need not be disposed in the wireless interval and the number of the monitoring apparatuses 100 can be reduced. Further, the monitoring apparatus 100 does not use the identified packets P as samples for analyzing the quality of the network N, whereby the quality of the network N can be analyzed more accurately.

Figure 2:
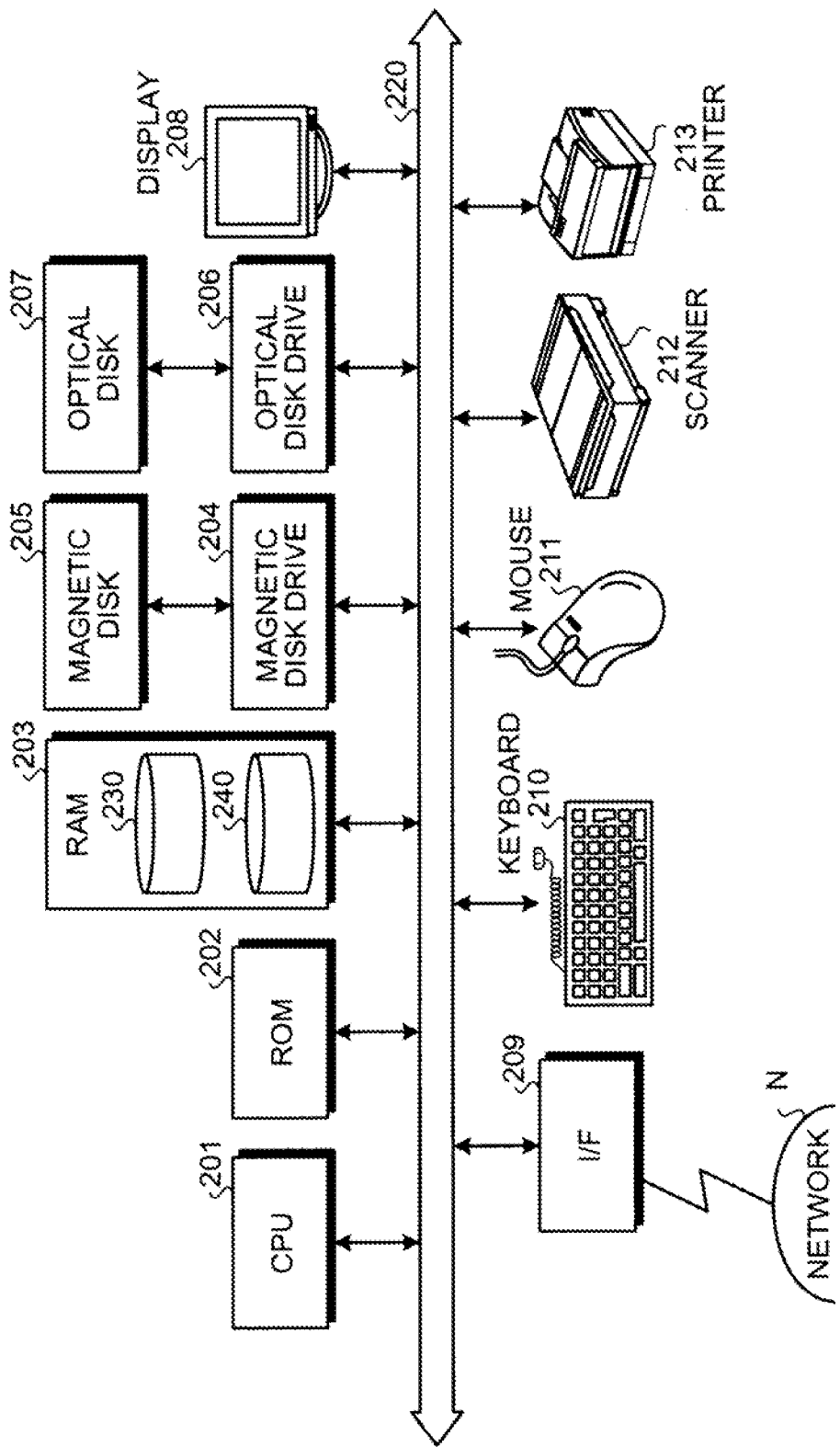
FIG. 2 is a block diagram depicting an example of a hardware configuration of a monitoring apparatus 100 according to the embodiments.

With reference to FIG. 2, an example of a hardware configuration of the monitoring apparatus 100 will be described.

FIG. 2 is a block diagram depicting an example of a hardware configuration of the monitoring apparatus 100 according to the embodiments. In FIG. 2, the monitoring apparatus 100 includes a central processing unit (CPU) 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 210, a mouse 211, a scanner 212, and a printer 213, respectively connected by a bus 220.

The CPU 201 governs overall control of the monitoring apparatus 100. The ROM 202 stores therein programs such as a boot program. The RAM 203 is used as a work area of the CPU 201 and stores therein a packet DB 230 and a class DB 240.

The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to the network N such as a local area network (LAN), a wide area network (WAN), and the Internet through a communication line and is connected to other apparatuses through the network N. The I/F 209 administers an internal interface with the network N and controls the input/output of data from/to external apparatuses. For example, a modem or a LAN adaptor may be employed as the I/F 209

The keyboard 210 includes, for example, keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. A track ball or a joy stick may be adopted provided each respectively has a function similar to a pointing device.

The scanner 212 optically reads an image and takes in the image data into the monitoring apparatus 100. The scanner 212 may have an optical character reader (OCR) function as well. The printer 213 prints image data and text data. The printer 213 may be, for example, a laser printer or an ink jet printer.

With reference to FIG. 3, the contents of the packet DB 230 stored in the RAM 203 depicted in FIG. 2 will be described.

FIG. 3 is a diagram depicting the contents of the packet DB 230. As depicted in FIG. 3, the packet DB 230 has a Real-time Transport Protocol (RTP) sequence number field, a transmission-side time stamp field, a reception-side time stamp field, a transmission source IP address field, a destination IP address field, a transmission source port field, a destination port field, and a Synchronization Source (SSRC) identifier field, collectively forming records for each transmission of a packet P.

The RTP sequence number field indicates the sequence number included in the RTP header of the captured packet P. The sequence number is a 16-bit number incremented by the transmission source, each time a packet P is transmitted.

Thus, based on the sequence number, the monitoring apparatus 100 can detect packet loss. The sequence number may be expanded to 32 bits.

The transmission side time stamp field indicates the time stamp included in the RTP header of the captured packet P. The time stamp is a 32-bit value indicating the time when the head byte of the packet P was transmitted by the transmission source. The reception-side time stamp field indicates the time when the packet P was captured (reception time) by the monitoring apparatus 100. Based on the time when the transmission source transmits the head byte of the packet P and the time when the monitoring apparatus 100 captures the packet P, the monitoring apparatus 100 can calculate the delay of the packet P.

The transmission source IP address field indicates the value of the 32 bits representing the IP address of the wireless communication apparatus WT that is included as the transmission source in the IP header of the captured packet P. The destination IP address field indicates the value of the 32 bits representing the IP address of the communication apparatus included as the destination in the IP header of the captured packet P.

The transmission source port field indicates the value of the 16 bits representing the port number included as the transmission source in the User Datagram Protocol (UDP) header of the captured packet P. The destination port field indicates the value of the 16 bits representing the port number included as the transmission source in the UDP header of the captured packet P.

The SSRC identifier field indicates the temporary transmission source identifier that changes with each session (1 communication) and is included in the RTP header of the captured packet P. Based on the transmission source IP address, the destination IP address, the transmission source port number, the destination port number, and the SSRC identifier, the monitoring apparatus 100 can separate the packets P according to session.

With reference to FIG. 4, the contents of the class DB 240 stored in the RAM 203 depicted in FIG. 2 will be described. The contents of the class DB 240 is a so-called frequency distribution table.

FIG. 4 is a diagram depicting the contents of the class DB 240 stored in the RAM 203 depicted in FIG. 2. As depicted in FIG. 4, the class DB 240 has a frequency field associated with a class name field, forming records when the monitoring apparatus 100 creates a frequency distribution table from the delays of the captured packets.

The class name field indicates a delay interval. The frequency field indicates the number of the packets P that have a delay included in the interval. For example, when the monitoring apparatus 100 captures 138 of the packets P having a delay that is 0 or greater and less than 10, the frequency field corresponding to the class name field "0 or greater and less than 10" indicates "138".

The monitoring apparatus 100, based on the class DB 240, extracts a set of the packets P having a large delay. For example, the monitoring apparatus 100 determines a median value of the intervals 400 having a frequency of 0 as a threshold and extracts a set of the packets P having a delay that is greater than or equal to the threshold. For instance, based on the class DB 240 depicted in FIG. 4, the monitoring apparatus 100 determines the threshold to be 110, and extracts the 4 packets P having a delay of 110 or greater.

Figure 5:
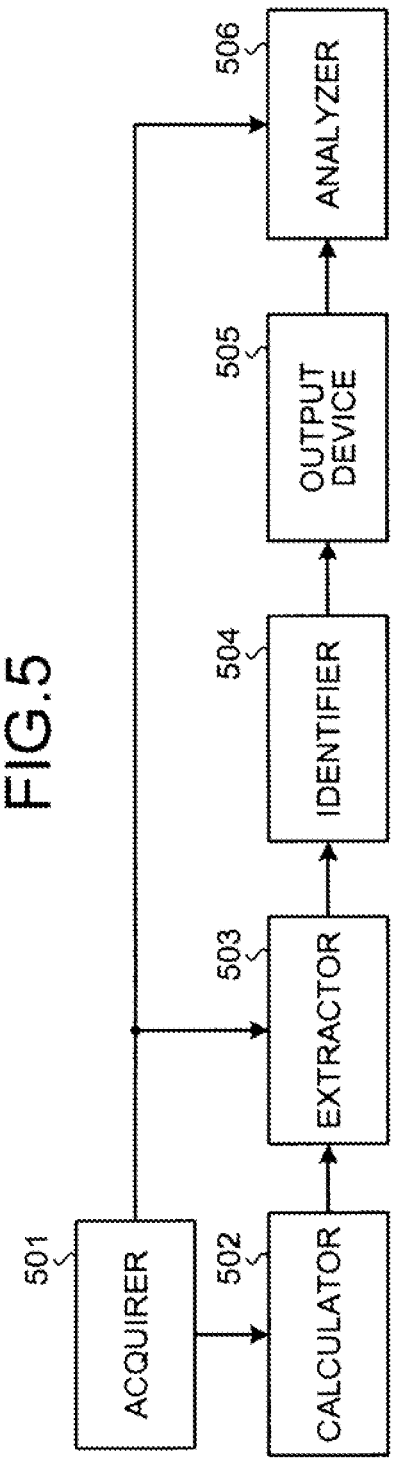
FIG. 5 is a block diagram depicting an example of a functional configuration of the monitoring apparatus 100.

With reference to FIG. 5, an example of a functional configuration of the monitoring apparatus 100 will be described.

FIG. 5 is a block diagram depicting an example of a functional configuration of the monitoring apparatus 100. The monitoring apparatus 100 includes an acquirer 501, a calculator 502, an extractor 503, an identifier 504, an output device 505, and an analyzer 506. These functions (the acquirer 501 to the analyzer 506) forming a controller are implemented, for example, by executing on the CPU 201, a program stored in a storage device such as the ROM 202, the RAM 203, the magnetic disk 205, and the optical disk 207 depicted in FIG. 2, or by the I/F 209.

The acquirer 501 has a function of acquiring a series of data transmitted from a communication device performing transmission processing with regularity. Here, the communication device performing transmission processing with regularity is the wireless communication apparatus WT described above. The data is the packet P described above. For example, the acquirer 501 connects to a wired interval and acquires the packets P on the communication path.

However, the captured packets P are assumed to include packets P transmitted from multiple wireless communication apparatuses WT and/or the packets P of other sessions. In this case, from among the captured packets P, the acquirer 501 extracts a series of the packets P transmitted from any one of the wireless communication apparatuses WT during 1 session, whereby the acquirer 501 is able to capture a series of the packet P on the communication path, for 1 session.

The processing by the acquirer 501 is performed with respect to 1 session, however, in the case of multiple sessions, the same processing may be performed for each of the sessions. The acquired data is stored to a storage area such as the RAM 203, the magnetic disk 205, and the optical disk 207.

The calculator 502 has a function of calculating the delay for each data in the series of data acquired by the acquirer 501. For example, based on the transmission time and the reception time of each of the packets P in the series of packets P acquired by the acquirer 501, the calculator 502 calculates each delay. For instance, the calculator 502 calculates the transmission interval and reception interval for successively captured packets P including a preceding packet P and a subsequent packet P and calculates "transmission interval-reception interval" as the delay of the subsequent packet P.

Thus, the calculator 502 is able to calculate the delay for each of the packets P in the series of packets P acquired by the acquirer 501. However, in the equation above, the delay of the head packet P of the series of packets P is not calculated. The calculation results are stored to a storage area such as the RAM 203, the magnetic disk 205, and the optical disk 207.

The extractor 503 has a function of extracting from the series of data, a set of data whose delay calculated by the calculator 502 is greater than or equal to a threshold. Here, the set of data is the set of the packets P described above. For example, based on the delay calculated by the calculator 502, the extractor 503 creates the class DB 240 (frequency distribution table) and based on the created class DB 240, calculates a threshold. From among the packets P acquired by the acquirer 501, the extractor 503 then extracts a set of the packets P having a delay (calculated by the calculator 502) that is greater than or equal to the threshold.

Thus, the extractor 503 is able to extract the packets P whose delay is caused by power management at the wireless communication apparatus WT. However, here the set of extracted packets P may also include packets P whose delay is caused by a factor other than the power management at the wireless communication apparatus WT.

The extractor 503 has a function of extracting from among data that remains after data whose cause of delay has been identified is removed from the series of data, a set of data whose delay calculated by the calculator 502 is greater than or equal to the threshold. Here, the data whose cause of delay has been identified is, for example, the packets P having a large delay consequent to packet loss.

For example, by discovering missing sequence numbers, the extractor 503 identifies the packets P whose delay is large consequent to packet loss. Based on the delays that remain after the delays caused by packet loss have been excluded from the delays calculated by the calculator 502, the extractor 503 creates the class DB 240 (frequency distribution table) and based on the created class DB 240, calculates a threshold. From among the packets P that remain after the packets P whose delay is large consequent to packet loss are excluded from the packets P acquired by the acquirer 501, the extractor 503 extracts a set of packets P whose delay calculated by the calculator 502 is greater than or equal to the calculated threshold.

Thus, the extractor 503, without extracting the packets P whose cause of delay has been identified, can extract the packets P whose delay is caused by power management at the wireless communication apparatus WT. The extracted data is stored to a storage area such as the RAM 203, the magnetic disk 205, and the optical disk 207.

The identifier 504 has a function of identifying from among the set of data extracted by the extractor 503, patterns of data that appear at equivalent intervals, successively for a given number of times or more. Here, a pattern is an appearance pattern of the packets P delayed at equivalent intervals consequent to power management at the wireless communication apparatus WT. However, if the interval at which the data appear is within a given range, the data are to be considered to appear at equivalent intervals. For example, even if the interval of data appearance is distributed between 290 milliseconds (ms) and 310 ms, the data is to be considered appear at equivalent intervals. Further, the interval at which delayed data appear may be judged based on sequence number. For example, an interval of every 10 numbers may be adopted as the interval at which delayed data appear.

For example, based on the reception times of each of the packets P in the set of the packets P, the identifier 504, from among the set of the packets P, identifies a pattern in which the packet P appears every 300 ms for 2 or more successive times. Thus, the identifier 504 is able to identify appearance patterns of the packets P delayed at equivalent intervals consequent to power management at the wireless communication apparatus WT.

The identifier 504 has a function of identifying, from among the set of data, a pattern of a group of data appearing at equivalent intervals, successively for a given number of times or more. For example, from among the set of the packets P, the identifier 504 groups packets P near the reception time and based on the reception times of the grouped packets P, identifies a pattern in which grouped packets P appear every 300 ms 2 or more times.

Thus, the identifier 504 is able to identify an appearance pattern of the packets P that are delayed at equivalent intervals consequent to power management at the wireless communication apparatus WT. Identification results are stored to a storage area such as the RAM 203, the magnetic disk 205, and the optical disk 207.

The output device 505 has a function of outputting information identifying each data relevant to the pattern identified by the identifier 504. The information identifying the data is, for example, the sequence numbers of the packets P described above. For example, the output device 505 outputs the sequence number of each of the packets P appearing approximately every 300 ms, whereby the output device 505 is able to output information identifying each of the packets P (among the set of packets P extracted by the extractor 503) whose delay is caused by power management at the wireless communication apparatus WT.

The output device 505 has further function of outputting information indicating each data of the data groups relevant to the pattern identified by the identifier 504. For example, the output device 505 outputs the sequence number of each packet P of the grouped packets P appearing approximately every 300 ms. Thus, the output device 505 is able to output information indicating each of the packets P (among the set of packets P extracted by the extractor 503) whose delay is caused by power management at the wireless communication apparatus WT. The form of output is, for example, display on the display 208, print out at the printer 209, and transmission to an external apparatus by the I/F 209. Further, output may be as storage to a storage area such as the RAM 203, the magnetic disk 205, and the optical disk 207.

The analyzer 506 has a function of analyzing the quality of the network N, based on the data that remains after the data identified by the information output by the output device 505 is excluded from the series of data acquired by the acquirer 501. Here, the analysis of quality is, for example, a calculation of the maximum value of, the minimum value of, and the average value of jitter (ms). The maximum value of, the minimum value of, and the average value of jitter occurring in 1 session may be calculated, or the maximum value of, the minimum value of, and the average value of jitter for each given period may be calculated.

For example, the analyzer 506 calculates jitter from each of the packets P in the series of packets acquired by the acquirer 501. An equation for calculating jitter J(i) from an i-th packet P is J(i)=J(i−1)+(|D(i−1,i)|−J(i−1))/16. Here, D(i,j) represents the delay of the i-th packet P, and the equation for the delay period D(i,j) is D(i,j)=(Rj−Ri)−(Sj−Si)=(Rj−Sj)−(Ri−Si). Here, S represents the time at which the transmission source transmits the head byte of the packet P and R represents the time at which the packet P is captured by the monitoring apparatus 100. Among the calculated jitter values, the maximum value of, the minimum value of, and the average value of jitter is calculated based on the values of jitter that remain after the values of jitter calculated from the packets P whose delay is caused by power management at the wireless communication apparatus WT are excluded.

Thus, the packets P whose delay is caused by power management at the wireless communication apparatus WT and that are not relevant to the quality of the network N are excluded, enabling the analysis of the quality of the network N to be performed with accuracy. The analysis results are stored to a storage area such as the RAM 203, the magnetic disk 205, and the optical disk 207. Further, the analysis results, for example, may be displayed on the display 208, printed out at the printer 213, and transmitted to an external apparatus by the I/F 209.

Figure 6:
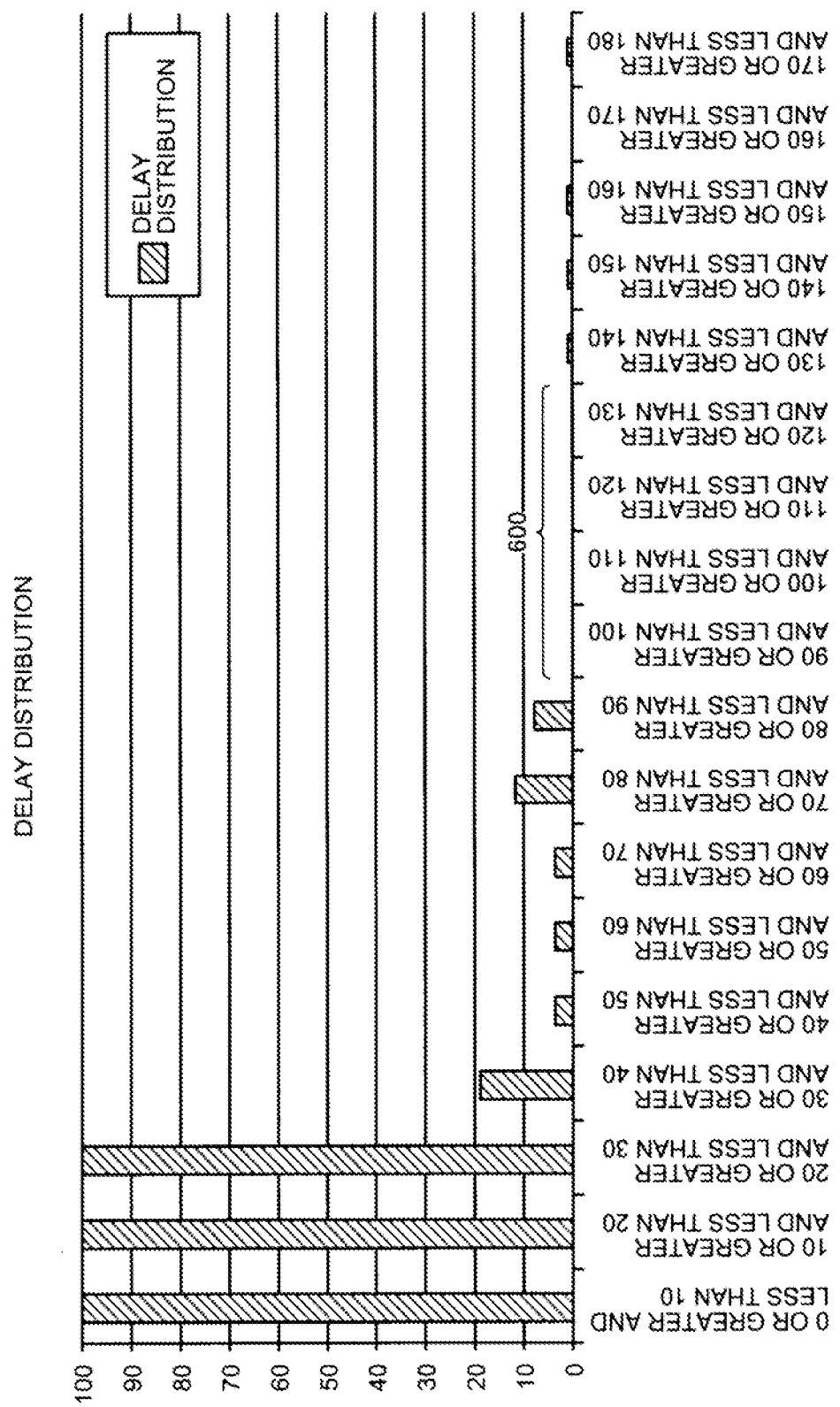
FIG. 6 is a diagram depicting an example of extraction of a set of packets P, based on the class DB 240, in a case where delayed packets P appear one at a time, at equivalent intervals.
Figure 7:
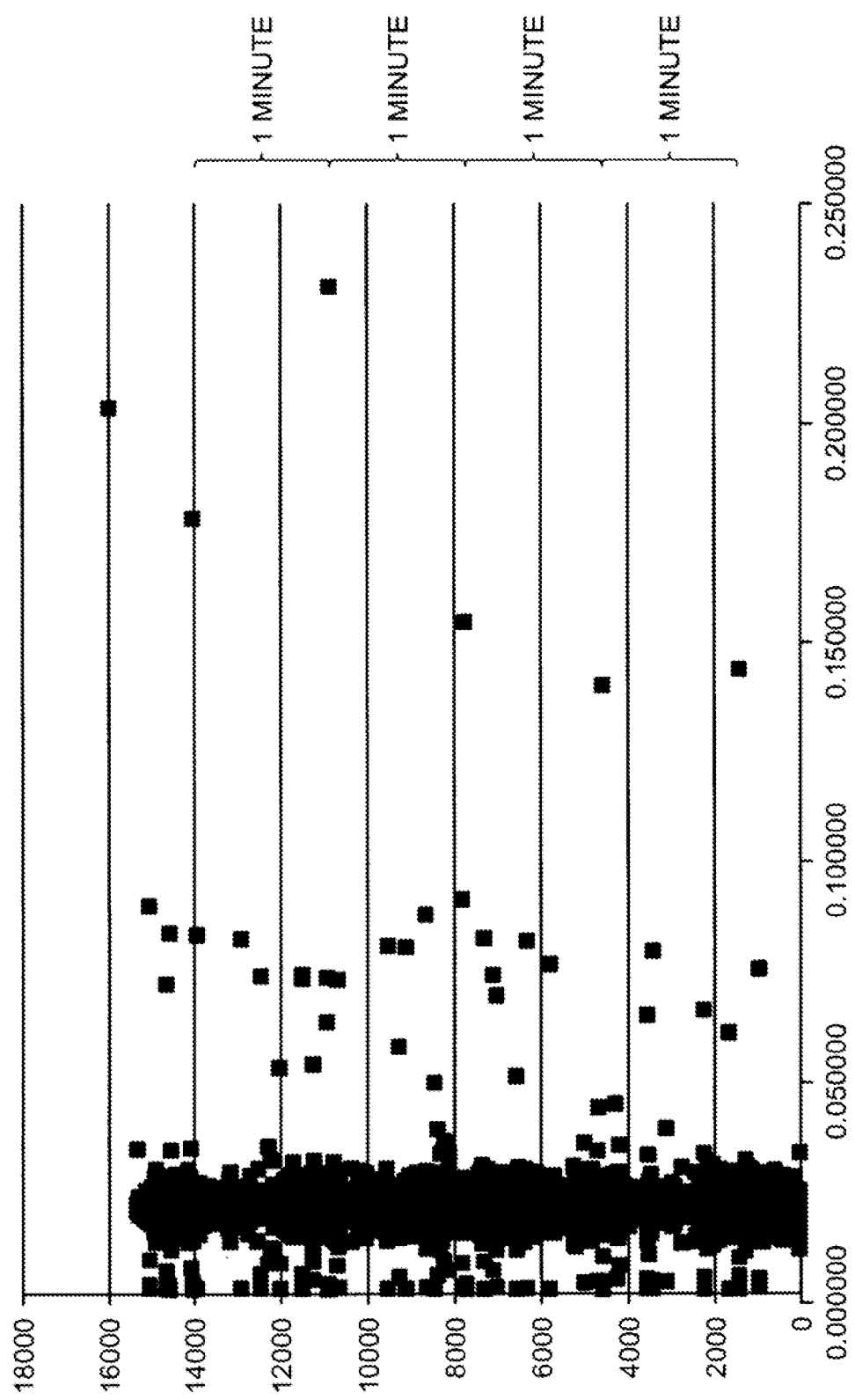
FIG. 7 is a diagram depicting identification of the cause of failure when delayed packets P appear one at a time, at equivalent intervals.
Figure 8:
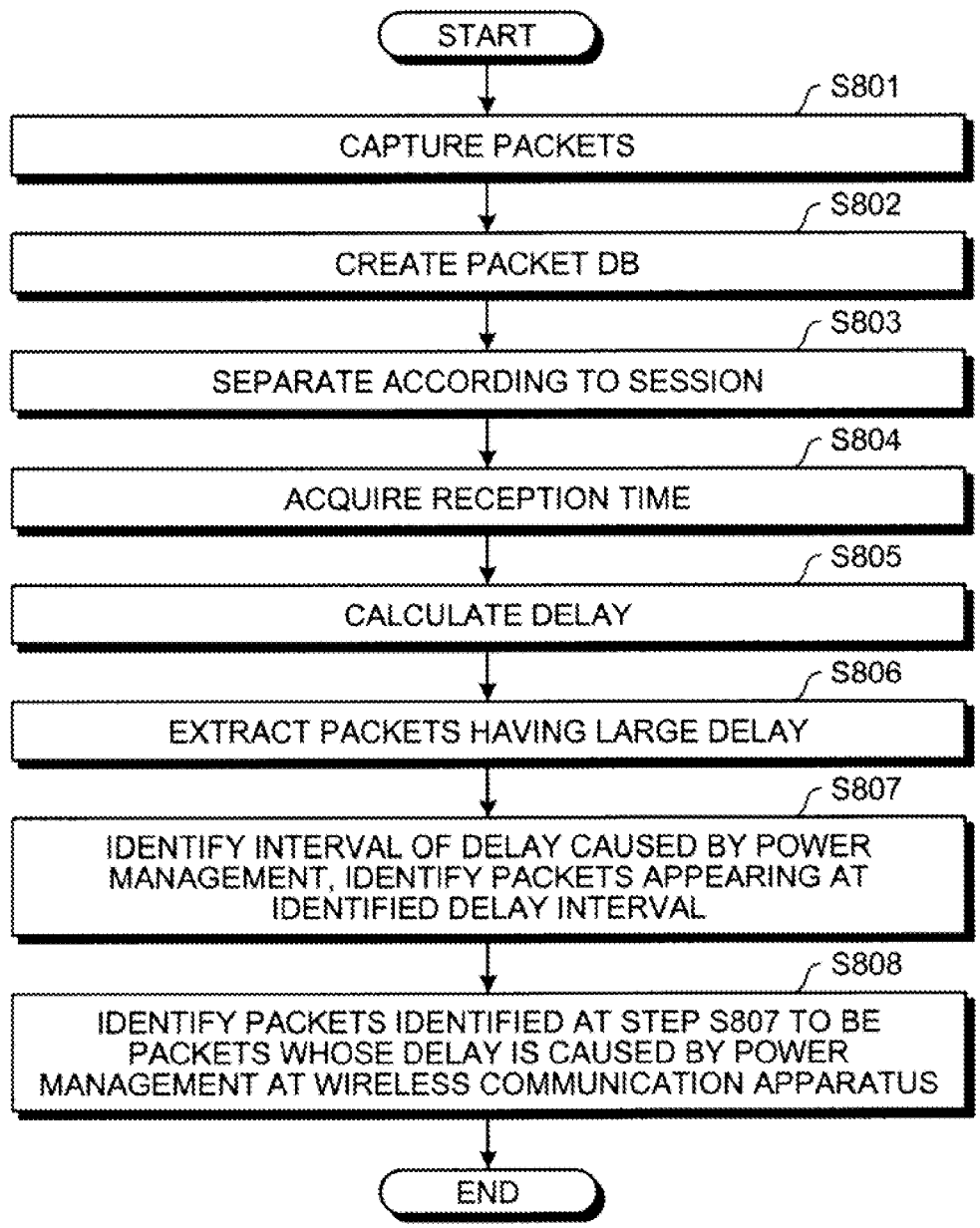
FIG. 8 is a flowchart of processing for identification of the cause of failure when delayed packets P appear one at a time, at equivalent intervals.

With reference to FIG. 6 to FIG. 8, an example of processing performed by the monitoring apparatus 100 to identify the cause of failure when packets P whose delay is caused by power management at the wireless communication apparatus WT appear one at a time, at equivalent intervals. Here, the delay caused by power management at the wireless communication apparatus WT is assumed to have a tendency of delaying the packet P one at a time, at equivalent intervals.

With reference to FIG. 6, an example of processing by the monitoring apparatus 100 to extract a set of the packets P, based on the class DB 240, where delayed packets P appear one at a time, at equivalent intervals will be described. Here, the monitoring apparatus 100 is assumed to capture the packets P on a wired interval and to create the packet DB 230.

FIG. 6 is a diagram depicting an example of extraction of a set of the packets P, based on the class DB 240, in a case where delayed packets P appear one at a time, at equivalent intervals. From the packet DB 230 and based on the transmission source IP address, the destination IP address, the transmission port number, the destination port number, and the SSRC, the monitoring apparatus 100 extracts the records for a series of the packets P occurring in 1 session.

The monitoring apparatus 100 creates the class DB 240 (frequency distribution table) from the extracted records for the series of the packets P. For example, from among the series of the packets P, if 138 of the packets P have a delay that is 0 or greater and less than 10, the monitoring apparatus 100 records "138" in the frequency field corresponding to the class name field "0 or greater and less than 10" in the class DB 240. The class DB 240 is depicted as a graph (i.e., histogram) in FIG. 6.

Here, the monitoring apparatus 100 extracts a set of the packets P having a large delay. For example, the monitoring apparatus 100 determines a median value (interval 600 whose frequency is 0) as a threshold and extracts a set of the packets P having a delay that is greater than or equal to the threshold. For instance, based on the class DB 240, the monitoring apparatus 100 determines the threshold to be 110, and extracts a set of the packets P whose delay is 110 or greater.

However, when the magnitude of the delay caused by power management at the wireless communication apparatus WT is clear, the monitoring apparatus 100 may set the threshold based on the known magnitude of the delay.

With reference to FIG. 7, the processing by the monitoring apparatus 100 to identify the cause of failure when delayed packets P appear one at a time, at equivalent intervals will be described.

FIG. 7 is a diagram depicting identification of the cause of failure when delayed packets P appear one at a time, at equivalent intervals. The monitoring apparatus 100, based on the set of the packets P, identifies an interval of delay caused by power management at the wireless communication apparatus WT. Here, based on the appearance of the packets P at approximately 1-minute intervals, the monitoring apparatus 100 identifies the interval of delay caused by power management at the wireless communication apparatus WT to be approximately 1-minute intervals.

Among the set of the packets P, the monitoring apparatus 100 identifies the packets P that appear at approximately 1-minute intervals as the packets P whose delay is caused by power management at the wireless communication apparatus WT. In this manner, the monitoring apparatus 100 identifies the interval of delay caused by power management and based on the identified delay interval, is able to identify the packets P whose delay is caused by power management at the wireless communication apparatus WT.

However, when the interval of the delay caused by power management at the wireless communication apparatus WT is clear, the monitoring apparatus 100 may identify the packets P based on the known interval of delay.

With reference to FIG. 8, processing details of the identification of the cause of failure when delayed packets P appear one at a time, at equivalent intervals will be described. The processing for the identification of the cause of failure is processing that executes the contents depicted in FIG. 6 and FIG. 7.

FIG. 8 is a flowchart of the processing for identification of the cause of failure when delayed packets P appear one at a time, at equivalent intervals. The acquirer 501 captures the packets P in a wired interval (step S801). The acquirer 501 acquires information from each of the captured packets P and creates the packet DB 230 (step S802). The acquirer 501 separates the packet DB 230 according to session (step S803).

The acquirer 501 acquires the reception times from records related to a series of the packets P corresponding to any given one of the sessions (step S804). The calculator 502 calculates, from the acquired reception times, the delay of each of the packets P in the series of the packets P corresponding the given session (step S805).

The extractor 503 extracts the packets P having a large delay (step S806). The identifier 504 identifies the interval of delay caused by power management and identifies the packets P appearing at the identified delay interval (step S807).

The identifier 504 identifies the packets P identified at step S807 to be the packets P whose delay is caused by power management at the wireless communication apparatus WT (step S808). Consequently, the monitoring apparatus 100 is able to identify the packets P whose delay is caused by power management at the wireless communication apparatus WT. The processes of the acquirer 501 to the identifier 504 are executed by the CPU 201.

Figure 9:
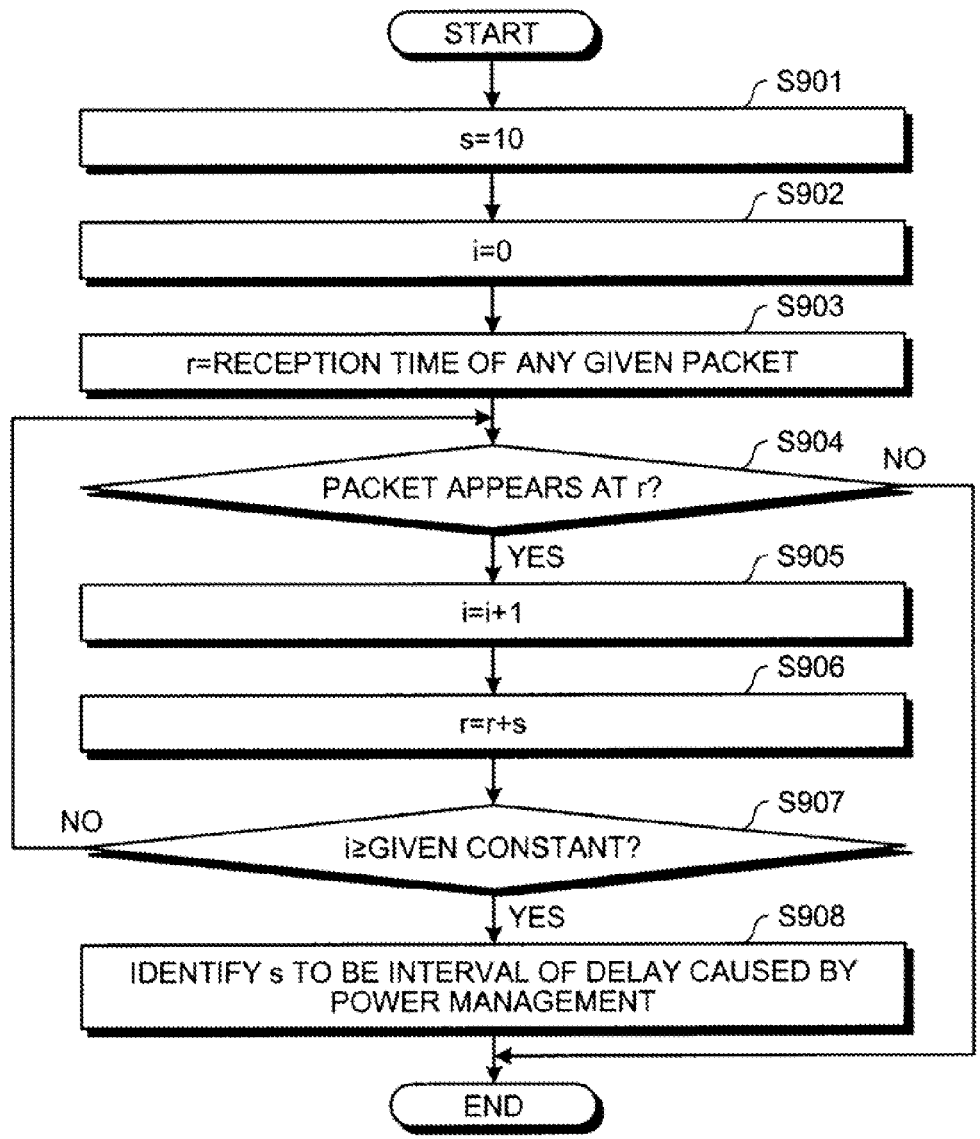
FIG. 9 is a flowchart of the processing at step S807, for identifying intervals of delay caused by power management.

With reference to FIG. 9, details of processing at step S807, for identifying the interval of delay caused by power management will be described.

FIG. 9 is a flowchart of the processing at step S807, for identifying intervals of delay caused by power management. The identifier 504 sets a variable s that is an estimated value of the interval of delay caused by power management, as 10 (step S901). The identifier 504 sets a variable i that represents the number of times that the packet P appears successively, as 0 (step S902).

The identifier 504 sets a variable r as the reception time of any given one of the packets P (step S903). The identifier 504 determines whether at time r, a packet P (packet having a large delay extracted at step S806) appears (step S904). If a packet P does not appear (step S904: NO), the identifier 504 ends the processing for identifying the interval of delay.

On the other hand, if a packet P appears (step S904: YES), the identifier 504 increments the variable i (step S905) and adds the variable s to the variable r (step S906). The identifier 504 determines whether the variable is at least a given constant (step S907). If the variable i is less than the given constant (step S907: NO), the identifier 504 returns to step S904.

On the other hand, if the variable i is greater than or equal to the given constant (step S907: YES), the identifier 504 determines the value of the variable s to be the interval of delay caused by power management (step S908), and ends the processing for identifying the interval of delay. Thus, the monitoring apparatus 100 is able to identify the interval of delay caused by power management. The above processes of the identifier 504 are executed by the CPU 201.

However, if the interval of delay caused by power management could not be identified, the monitoring apparatus 100 may change the value of the variable s or of the variable r and again perform the processing for identifying the interval of delay caused by power management. Further, if the packet P appears within a given range before or after the time r, the monitoring apparatus 100 may consider the packet P to have appeared at time r.

With reference to FIG. 10, an example of quality analysis by the monitoring apparatus 100 when delayed packets P appear one at a time, at equivalent intervals will be described. As depicted in FIG. 6 to FIG. 9, the monitoring apparatus 100 can identify the packets P whose delay is caused by power management at the wireless communication apparatus WT. As a result, based on the packets P that remain after the identified packets P have been excluded from the captured series of the packets P, the monitoring apparatus 100 can perform accurate analysis of the quality of the network N.

FIG. 10 is a diagram depicting an example of quality analysis when delayed packets P appear one at a time, at equivalent intervals. As depicted in FIG. 10, the monitoring apparatus 100 can perform accurate analysis of the quality of the network N. For example, the monitoring apparatus 100 calculates the jitter for each of the packets P in the captured series of packets P and further calculates the maximum value (MAX) of the jitter, the minimum value (MIN) of the jitter, and the average value (AVG) of the jitter. Here, in the calculation of the maximum value (MAX) of the jitter, the minimum value (MIN) of the jitter, and the average value (AVG) of the jitter, the monitoring apparatus 100 does not use the jitter values 1010 calculated from the packet P whose delay is cause by power management at the wireless communication apparatus WT. Consequently, the monitoring apparatus 100 can calculate the quality 1020 (the maximum value (MAX) of the jitter, the minimum value (MIN) of the jitter, and the average value (AVG) of the jitter) of the network N with accuracy. The monitoring apparatus 100 outputs the calculated quality of the network N.

The monitoring apparatus 100 may use the jitter values calculated from the packets P whose delay is caused by power management at the wireless communication apparatus WT to calculate the reception quality 1030 (the maximum value (MAX) of the jitter, the minimum value (MIN) of the jitter, and the average value (AVG) of the jitter). The monitoring apparatus 100 may output the calculated reception quality in addition to the quality of the network N. The monitoring apparatus 100 may output indication that the delay of the packets P is caused by power management at the wireless communication apparatus WT.

Figure 11:
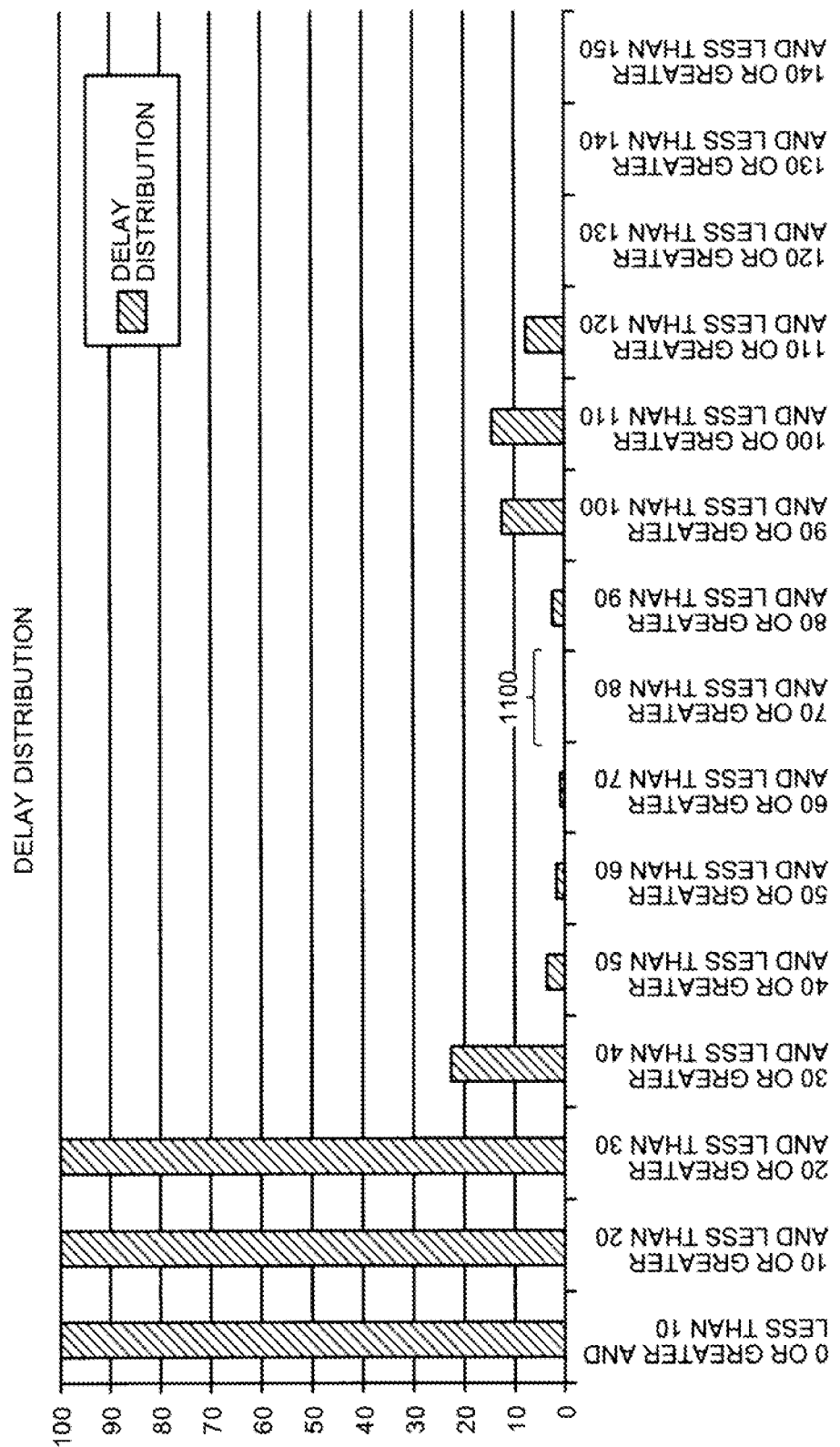
FIG. 11 is a diagram depicting an example of extraction of a set of the packets P, based on the class DB 240, when delayed packets P appear a few at a time, at equivalent intervals.
Figure 12:
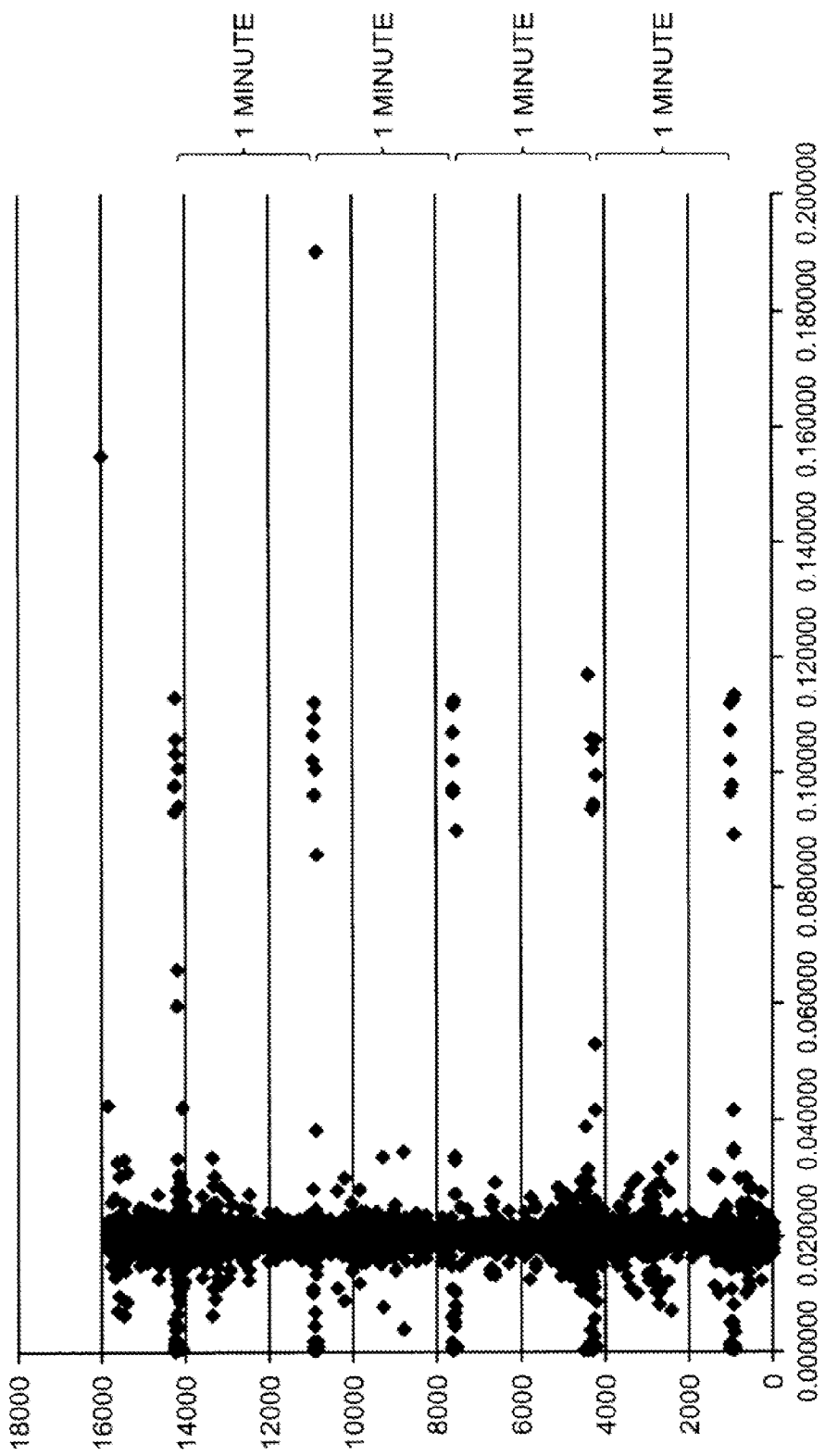
FIG. 12 is a diagram depicting identification of the cause of failure when delayed packets P appear a few at a time, at equivalent intervals.

With reference to FIG. 11 to FIG. 13, an example of processing by the monitoring apparatus 100 to identify the cause of failure when the packets P whose delay is caused by power management at the wireless communication apparatus WT appear a few at a time, at equivalent intervals will be described. Here, the delay caused by power management at the wireless communication apparatus WT is assumed to have a tendency to cause every few packets P to be delayed, at equivalent intervals.

With reference to FIG. 11, an example of processing by the monitoring apparatus 100 to extract a set of the packets P based on the class DB 240, when delayed packets P appear a few at a time, at equivalent intervals. Here, the monitoring apparatus 100 is assumed to capture the packets P on a wired interval and to create the packet DB 230.

FIG. 11 is a diagram depicting an example of extraction of a set of the packets P, based on the class DB 240, when delayed packets P appear a few at a time, at equivalent intervals. From the packet DB 230 and based on the transmission source IP address, the destination IP address, the transmission port number, the destination port number, and the SSRC, the monitoring apparatus 100 extracts the records for a series of the packets P occurring in 1 session. The monitoring apparatus 100 creates the class DB 240 (frequency distribution table) from the extracted records for the series of the packets P. The class DB 240 is depicted as a graph (i.e., histogram) in FIG. 11.

Here, the monitoring apparatus 100 extracts a set of the packets P having a large delay. For example, the monitoring apparatus 100 determines the median value (interval 1100 whose frequency is 0) as a threshold and extracts a set of the packets P whose delay is greater than or equal to the threshold. For instance, based on the class DB 240, the monitoring apparatus 100 determines the threshold to be 75, and extracts a set of the packets P whose delay is 75 or greater.

However, when the magnitude of the delay caused by power management at the wireless communication apparatus WT is clear, the monitoring apparatus 100 may set the threshold based on the known magnitude of the delay.

With reference to FIG. 12, processing by the monitoring apparatus 100 to identify the cause of failure when delayed packets P appear a few at a time, at equivalent intervals will be described.

FIG. 12 is a diagram depicting identification of the cause of failure when delayed packets P appear a few at a time, at equivalent intervals. The monitoring apparatus 100, among the set of the packets P, groups the packets P that are near the reception time. The monitoring apparatus 100, based on the grouped the packets P, identifies the interval of delay caused by power management at the wireless communication apparatus WT. Here, based on the appearance of the packets P at approximately 1-minute intervals, the monitoring apparatus 100 identifies the interval of delay caused by power management at the wireless communication apparatus WT to be approximately 1-minute intervals.

Among the set of the packets P, the monitoring apparatus 100 identifies the packets P that appear at approximately 1-minute intervals as the packets P whose delay is caused by power management at the wireless communication apparatus WT. In this manner, the monitoring apparatus 100 identifies the interval of delay caused by power management and based on the identified delay interval, is able to identify the packets P whose delay is caused by power management at the wireless communication apparatus WT.

However, when the interval of delay caused by power management at the wireless communication apparatus WT is clear, the monitoring apparatus 100 may identify the packets P based on the known interval of delay.

With reference to FIG. 13, processing details of the identification of the cause of failure when delayed packets P appear a few at a time, at equivalent intervals will be described. The processing for the identification of the cause of failure is processing that executes the contents depicted in FIG. 11 and FIG. 12.

FIG. 13 is a flowchart of the processing for identification of the cause of failure when delayed packets P appear a few at a time, at equivalent intervals. Here, processing identical to that depicted in FIG. 8 is given the same reference numerals used in FIG. 8 and description thereof is omitted.

The extractor 503 transitions to step S1301 after step S806. The extractor 503, among the extracted packets P, groups the packets P that are near the reception time (step S1301). The identifier 504 identifies the interval of delay caused by power management, and identifies the grouped packets P appearing at the identified delay interval (step S1302).

The identifier 504 identifies each of the packets P identified at step S1302 to be packets P whose delay is caused by power management at the wireless communication apparatus WT (step S1303). Thus, the monitoring apparatus 100 is able to identify the packets P whose delay is caused by power management at the wireless communication apparatus WT. The processing of the acquirer 501 to the identifier 504 above is executed by the CPU 201.

At step S1302, the processing of identifying the interval of delay caused by power management is identical to that depicted in FIG. 9 and description thereof is omitted. For example, at step S903 in FIG. 9, by setting the average reception time of the grouped packets P as the variable r, the interval of the delay caused by power management can be identified.

An example of quality analysis by the monitoring apparatus 100 when delayed packets P appear a few at a time, at equivalent intervals will be described. As depicted in FIG. 11 to FIG. 13, the monitoring apparatus 100 can identify the packets P whose delay is caused by power management at the wireless communication apparatus WT. As a result, similar to FIG. 10, based on the packets P that remain after the identified packets P have been excluded from the captured series of packets P, the monitoring apparatus 100 can perform accurate analysis of the quality of the network N.

As described, the monitoring apparatus, the monitoring method, and computer product calculate the delay of each packet P among a series captured in a wired interval. Based on the tendency of delay caused by power management at the wireless communication apparatus WT and the delay calculated for each packet P in the series, the monitoring apparatus 100 can identify the packets P whose delay is caused by power management at the wireless communication apparatus WT.

Thus, based on the delay of the packets P, the monitoring apparatus 100 identifies the cause of failure in a wireless interval. Consequently, even when the monitoring apparatus 100 monitors the packets P that are in a wired interval and have lost information inherent to the packets P while the packets P are in a wireless interval, the cause of failure can be identified in the wireless interval. The information inherent to the packets P while in a wireless interval is information indicating that the wireless communication apparatus WT performed power savings.

As a result, since the monitoring apparatus 100 can identify in a wired interval, the cause of failure in a wireless interval, an apparatus to monitor packets in the wireless interval need not be disposed. Consequently, the number of packet monitoring apparatuses in the network N overall decreases, thereby enabling the cost to be reduced.

Since the monitoring apparatus 100 can identify in an upstream wired interval of the network N, the cause of failure in a wireless interval, even when communication is performed by multiple relay devices consequent to the wireless communication apparatus WT being transportable, the cause of failure in a wireless interval can be properly identified.

Since the monitoring apparatus 100 identifies the pattern of the packets P appearing successively a given number of time or more, at equivalent intervals, the monitoring apparatus can cope with cases where the delay caused by power management at the wireless communication apparatus WT has a tendency to delay the packets P one at a time, at equivalent intervals.

Since the monitoring apparatus 100 identifies the pattern of the packets P appearing successively a given number of time or more, at equivalent intervals, the monitoring apparatus 100 can cope with cases where the delay caused by power management at the wireless communication apparatus WT has a tendency to delay the packets P a few at a time, at equivalent intervals.

The monitoring apparatus 100 eliminates, from among the candidates of the packets P whose delay is caused by power management at the wireless communication apparatus WT, the packets P whose cause of delay has already been identified. Consequently, the monitoring apparatus 100 is able to more accurately identify the packets P whose delay is caused by power management at the wireless communication apparatus WT.

The monitoring apparatus 100 does not use the identified packets P as samples for analyzing the quality of the network N, whereby the monitoring apparatus 100 is able to analyze the quality of the network N more accurately, without the effects of the delay caused by power management at the wireless communication apparatus WT.

The monitoring apparatus 100, by preliminarily acquiring the tendency of the delay caused by power management at the wireless communication apparatus WT, can more accurately identify the packets P whose delay is caused by power management at the wireless communication apparatus WT.

The monitoring method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitoring apparatus comprising:
a processor to execute a process including:
calculating the delay of each of the data among acquired series of data transmitted from a communication apparatus that performs transmission processing with regularity;
extracting from the series of data, a set of data whose calculated delays are greater than or equal to a threshold; and
identifying, from among the extracted set of data, a pattern of data appearing successively for a given number of times or more, at equivalent intervals; and
an output device that outputs information indicating the data related to the identified pattern.

2. The monitoring apparatus according to claim 1, wherein the identifying includes identifying from among the extracted set of data, a pattern of a group of data that appear successively for a given number of times or more, at equivalent intervals, and
the output device outputs information indicating the group of data related to the identified pattern.

3. The monitoring apparatus according to claim 1, wherein the extracting includes extracting from among data remaining after data whose cause of delay has been identified are excluded from the series of data, the set of data whose calculated delay is greater than or equal to the threshold.

4. The monitoring apparatus according to claim 1, wherein the process further comprises performing network quality analysis based on data that remains after data identified by information output by the output device have been excluded from the acquired series of data.

5. The monitoring apparatus according to claim 1, wherein the identifying includes identifying the pattern, based on information related to the communication apparatus and preliminarily acquired.

6. A monitoring method executed by a computer, the monitoring method comprising:

calculating the delay of each of the data among acquired series of data transmitted from a communication apparatus performing transmission processing with regularity;

extracting from the series of data, a set of data whose calculated delays are greater than or equal to a threshold;

identifying from among the extracted set of data, a pattern of data appearing successively for a given number of times or more, at equivalent intervals; and outputting information indicating the data related to the identified pattern.

7. A non-transitory, computer-readable medium storing therein a monitoring program that causes a computer to execute a process, the process comprising:

calculating the delay of each of the data among acquired series of data transmitted from a communication apparatus performing transmission processing with regularity;

extracting from the series of data, a set of data whose calculated delays are greater than or equal to a threshold;

identifying from among the extracted set of data, a pattern of data appearing successively for a given number of times or more, at equivalent intervals; and outputting information indicating the data related to the identified pattern.

* * * * *